US009569741B2

(12) United States Patent
Phillips et al.

(10) Patent No.: US 9,569,741 B2
(45) Date of Patent: Feb. 14, 2017

(54) VIRTUAL MANAGEMENT OF WORK ITEMS

(71) Applicants: Jonathan Robert Phillips, Plano, TX (US); Gregory D. Weber, Westminster, CO (US)

(72) Inventors: Jonathan Robert Phillips, Plano, TX (US); Gregory D. Weber, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 228 days.

(21) Appl. No.: 13/630,020

(22) Filed: Sep. 28, 2012

(65) Prior Publication Data
US 2014/0095235 A1    Apr. 3, 2014

(51) Int. Cl.
*G06Q 10/06* (2012.01)
*G06Q 10/10* (2012.01)

(52) U.S. Cl.
CPC .......... *G06Q 10/0631* (2013.01); *G06Q 10/10* (2013.01)

(58) Field of Classification Search
CPC ................................ G06Q 10/06; G06Q 10/10
USPC ....... 705/7, 8, 9, 7.11, 7.12, 7.13, 7.14, 7.15
See application file for complete search history.

(56) References Cited

U.S. PATENT DOCUMENTS

| | | | | |
|---|---|---|---|---|
| 2006/0241996 A1* | 10/2006 | Burger | ................... | G06Q 10/10 705/7.15 |
| 2009/0204470 A1* | 8/2009 | Weyl et al. | ........................ | 705/9 |
| 2009/0204471 A1* | 8/2009 | Elenbaas et al. | ................ | 705/9 |
| 2010/0020100 A1* | 1/2010 | Dolbier et al. | ............... | 345/634 |
| 2010/0153858 A1* | 6/2010 | Gausman | ............ | G06Q 10/101 715/757 |
| 2011/0029897 A1* | 2/2011 | Russell | ........................ | 715/757 |
| 2011/0055108 A1* | 3/2011 | Galeteanu et al. | ........... | 705/348 |
| 2011/0055732 A1* | 3/2011 | Dawson et al. | ............... | 715/757 |
| 2011/0072367 A1* | 3/2011 | Bauer | ................. | G06F 3/04815 715/757 |
| 2012/0054281 A1* | 3/2012 | Westmoreland | .............. | 709/205 |
| 2013/0138745 A1* | 5/2013 | Tardelli et al. | ............... | 709/206 |
| 2014/0095397 A1 | 4/2014 | Phillips et al. | | |

OTHER PUBLICATIONS

U.S. Appl. No. 13/471,890, filed May 15, 2012, entitled "Input, Display and Monitoring of Contact Center Operation in a Virtual Reality Environment." 48 pages.
U.S. Appl. No. 13/471,931, filed May 15, 2012, entitled "Agent and Customer Avatar Presentation in a Contact Center Virtual Reality Environment." 46 pages.
U.S. Appl. No. 13/471,954, filed May 15, 2012, entitled "Configuring a Virtual Reality Environment in a Contact Center." 45 pages.

* cited by examiner

*Primary Examiner* — Nga B Nguyen
(74) *Attorney, Agent, or Firm* — Sheridan Ross P.C.

(57) ABSTRACT

Systems and methods are provided to solve these and other problems and disadvantages of the prior art. A list of work items is received. A work item can be anything that a user may work on such as an email, an incoming call in a contact center, a trouble ticket, and the like. A user is identified to work on the list of work items. A virtual setting is created based on the list of work items and the user. The virtual setting includes a virtual list of work items that represents the list of work items and a user avatar that represents the user. The user can select a work item from the virtual list of work items. The user is then presented with the work item. For example, if the work item is an email, the email will be presented. The user can then process the work item.

20 Claims, 7 Drawing Sheets

VIRTUAL MANAGEMENT OF WORK ITEMS

TECHNICAL FIELD

The system and method that relate to management of work items and in particular to management of virtual work items.

BACKGROUND

Today, there are systems that are designed to manage work items. For example, a contact center is designed to manage work items such voice calls, video calls, or multimedia calls that are placed into the contact center. Other types of systems that are designed to manage work items are applications, such as email systems or trouble ticket tracking systems. Each of these systems uses a traditional graphical user interface to allow the user to track individual work items.

The problem with these types of systems is that they are not always intuitive to the user. In addition, traditional systems fail incorporate the concepts of virtualization. What is needed is an easy to understand solution that incorporates the advantages of virtualization in managing work items.

SUMMARY

Systems and methods are provided to solve these and other problems and disadvantages of the prior art. A list of work items is received. A work item can be anything that a user may work on such as an email, a voice mail, an incoming call in a contact center, a trouble ticket, and the like. A user is identified to work on the list of work items. A virtual setting is created based on the list of work items and the user. The virtual setting includes a virtual list of work items that represents the list of work items and a user avatar that represents the user. The user can select a work item from the virtual list of work items. The user is then presented with the work item. For example, if the work item is an email, the email will be presented to the user. The user can then process the work item.

In an embodiment, an indication that the selected work item is being processed is received. This causes the selected work item to be marked as being processed in the virtual list of work items. An indication that the selected work item has been completed is also received. This causes the selected work item to be deleted from the virtual list of work items.

In an embodiment, the virtual setting also includes an approver avatar that represents a second user. The system detects that the selected work item has been completed. This causes the selected work item to be placed in a virtual list of completed work items. The second user selects the work item in the virtual list of completed work items. The second user indicates that the selected work item in the virtual list of completed work items has been reviewed. If an approval is received by the second user, the work item in the virtual list of completed work items is deleted.

In an embodiment, the user is a plurality of users and the user avatar is a plurality of user avatars that represent the plurality of users. A second selection of the work item is received from one of the users. In response to the second selection, an attribute associated with the selected work item is presented to the user.

In an embodiment, an indication is received from the user to sort through the list of work items. An indication is received from the user to identify an attribute associated with the selected work item. The identified attribute is then presented to the user.

In an embodiment, the selected work item is presented only when the user has sufficient rights. The sufficient rights can be based a security clearance of the user, a skill level of the user, and an approval from a supervisor.

In an embodiment, the list of work items has to be worked in a defined order.

In an embodiment, the list of work items can represent a group of calls in an in-bound queue in a contact center, a group of call numbers in an-outbound queue in the contact center, a group of items in an inbox, a list of trouble tickets, a set of call back requests, and a group of documents to be processed.

In an embodiment, the virtual list of work items comprises a plurality of virtual lists of work items and wherein the user can select the work item from any of the plurality of virtual lists of work items.

DETAILED DESCRIPTION

Figure 1:
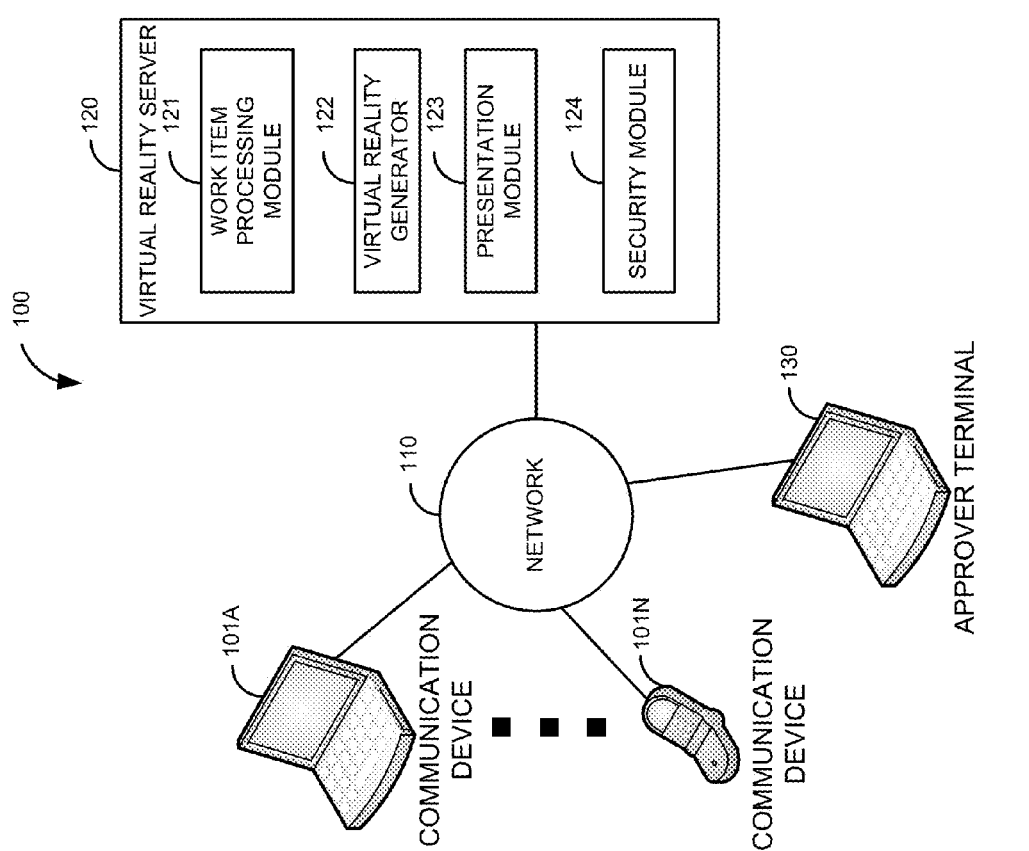
FIG. 1 is a block diagram of a first illustrative system for virtually managing work items.

FIG. 1 is a block diagram of a first illustrative system 100 for virtually managing work items. The first illustrative system 100 comprises communication devices 101A-101N, a network 110, a virtual reality server 120, and an approver terminal 130.

The communication devices 101A-101N can be any device that can communicate on the network 110, such as a Personal Computer (PC), a telephone, a video system, a cellular telephone, a Personal Digital Assistant (PDA), a tablet device, a notebook device, and the like. As shown in FIG. 1, any number of communication devices 101A-101N may be connected to network 110, including only a single communication device 101. In addition, the communication device 101 may be directly connected to the virtual reality server 120.

The virtual reality server 120 may be any hardware/software that can provide virtualization, such as a server, a Private Branch Exchange (PBX), a network server, a server array, communication system, a personal computer, a video server, a mail server, an Instant Messaging (IM) server, a contact center, and the like. The virtual reality server 120 further comprises a work item processing module 121, a virtual reality generator 122, a presentation module 123, and a security module 124. Although all the elements of the virtual reality server 120 are shown in a single device, any of the elements of the virtual reality servers 120 may be distributed across multiple servers or devices.

The work item processing module 121 can be any hardware/software that can process work items. For example, the work item processing module 121 can be an in-bound queue in a contact center, an-outbound queue in the contact center, an inbox handling system, an email system, a trouble ticket handling system, a call back request management system, a document processing system, and the like.

The virtual reality generator 122 can be any hardware/software that can animate a process such as a video processing system, a gaming system, Avaya's AvayaLive Engage™ system, and the like. The presentation module 123 can be any hardware/software that can present information to a user such as a video processor, a display, a codec, a video switch, a speaker, any combination of these, and the like. The security module 124 can be any hardware/software that can manage security or authentication by users, such as a digital certificate system, an operating system, a directory service, and the like.

The network 110 can be any network that can send and receive information, such as the Internet, a Wide Area Network (WAN), a Local Area Network (LAN), the Public Switched Telephone Network (PSTN), a packet switched network, a circuit switched network, a cellular network, a combination of these, and the like. Network 110 can use a variety of protocols, such as Ethernet, Internet Protocol (IP), Session Initiation Protocol (SIP), Integrated Services Digital Network (ISDN), and the like.

The approver terminal 130 can be any device that can communicate on the network 110, such as a Personal Computer (PC), a telephone, a video system, a cellular telephone, a Personal Digital Assistant (PDA), a tablet device, a notebook device, and the like. In addition, the approver terminal 130 may be directly connected to the virtual reality server 120.

The work item processing module 121 receives a list of work items. The list of work items can by any type of work items, such as a group of calls in an in-bound queue in a contact center, a group call numbers in an-outbound queue in the contact center, a group of items in an inbox, a list of trouble tickets, a set of call back requests, a group of documents to be processed, a group of emails, any combination of these, and the like. The work items may be prioritized in a specific order. Work items may be tagged to identify priority items. The work item processing module 121 can receive the list of work items in various ways, such as an administrator defining the list of work items, based on receiving a call, based on adding a document into a directory, based on identifying contacts to be called, based on a posting on a web site, based on receiving an email, based on receiving a voice message, based on receiving a text message, based on receiving video message, based on receiving a video call, and the like. The list of work items can be defined all at one time, can change dynamically based on items being added to the list of work items, or can change based on items being deleted from the list of work items. For example, the list of work items can change dynamically as an email is received in an inbox. The list of work items can be worked in a defined order or can be worked in an order defined by a user.

The work item processing module 121 identifies one or more users to work on the list of work items. This can be accomplished in various ways, such as an administrator defining the one or more users, based on a schedule of agents in a contact center, based on a user logging into a system, based on an organizational chart, based on a defined owner of an inbox, based on an agent becoming available, based on an agent skill, based a Key Performance Indicator (KPI), any combination of these, and the like.

The virtual reality generator 122 creates a virtual setting. The virtual setting can be a virtual room, a virtual location, a virtual area, and the like. The virtual setting further comprises a virtual list of work items that represents the list of work items. The virtual setting also comprises a user avatar that represents the user to work on the list of work items. The virtual setting can also include other virtual elements, such as a virtual table, a virtual door, and the like. The virtual setting is displayed to the user and the user can then interact with the virtual setting. For example, the above described virtual setting is illustratively shown in FIG. 5. The virtual list of work items can comprise any number of work items, including zero work items. The virtual list of work items can be represented in various ways, such as a stack of documents, a group of items on a virtual table, a line of avatars visually displayed in a queue or line, sorted by priority, a picture in a queue in a retail bank branch, a group of customers waiting for a cashier in a supermarket, and the like. The virtual list of work items can comprise multiple virtual lists of work items. For instance, multiple call queues in a contact center can be represented by multiple virtual lists of work items in the virtual setting. The user can select any of the work items in the multiple virtual lists of work items.

The virtual reality generator 122 receives a selection from the user of a work item from the virtual list of work items. The selection of the work item from the virtual list of work items can be accomplished in various ways. For instance, the work item can be selected based on a mouse click, based on a movement of the user avatar next to the work item, by a section from a menu, based on the user avatar setting next to the work item, by the user avatar touching the work item, based on the work item being on the top of the virtual list of work items, and the like.

The presentation module 123 presents the selected work item to the user. The presentation of the selected work item can be accomplished in various ways. For example, a video mail can be presented visually and audibly, an email can be presented visually, a document can be displayed visually, a trouble ticket can be displayed visually or audibly, a voice mail can be presented audibly, an email or text message can be presented audibly, and the like. The user, via communication device 101 can view or hear the presented work item.

The virtual reality generator 122 receives an indication that the first work item is being processed. This can be accomplished in various ways, such as, by a mouse click, by a selection, by a movement of the user avatar, by a touch on a touch screen, and the like. The virtual reality generator 122 marks the selected work item as being processed. This can be accomplished in various ways such as changing the color of the selected work item, highlighting the selected work item, making the selected work item un-selectable, and the like.

The virtual reality generator 122 receives an indication that the selected work item has been completed. This can be accomplished in various ways such as those described previously. The selected work item is then deleted from the virtual list of work items.

The virtual setting can further include an approver avatar. The approver avatar represents a second user. After a selected work item has been completed by the user, the virtual reality generator 122 places the selected work item in a virtual list of completed work items (i.e., like shown in FIG. 6). The virtual reality generator 122 receives a selection, by the second user of the selected work item in the virtual list of completed work items. The virtual reality generator 122 receives an indication that the selected work item in the virtual list of completed work items has been reviewed by the second user. If the second user approves the selected work item, the selected work item is deleted from the virtual list of completed work items. If the second user does not approve the selected work item, the selected work item may be placed in a different list of work items, reassigned to another person, reprioritized, and the like.

Figure 2:
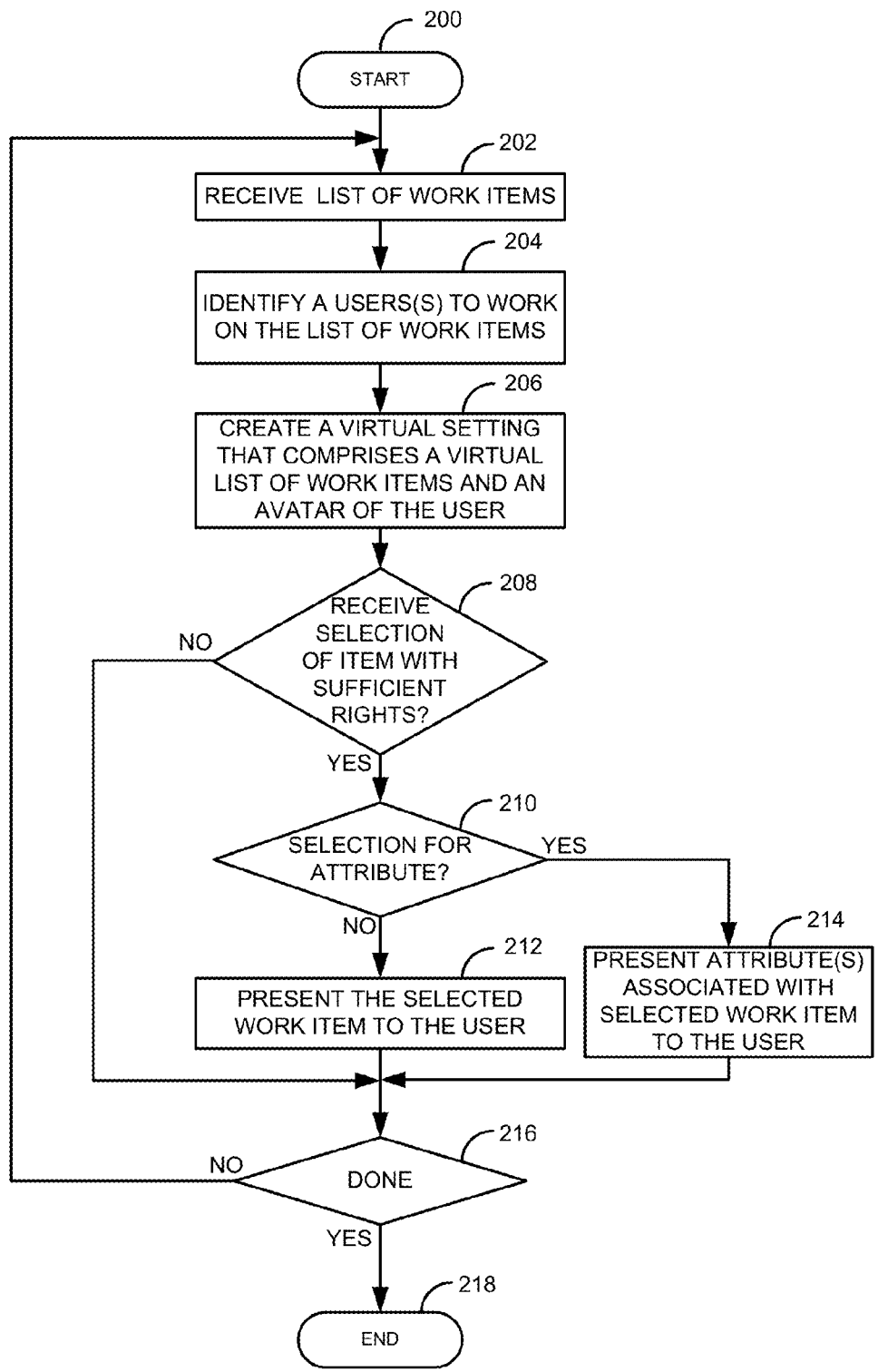
FIG. 2 is a flow diagram of a method for virtually managing work items.
Figure 3:
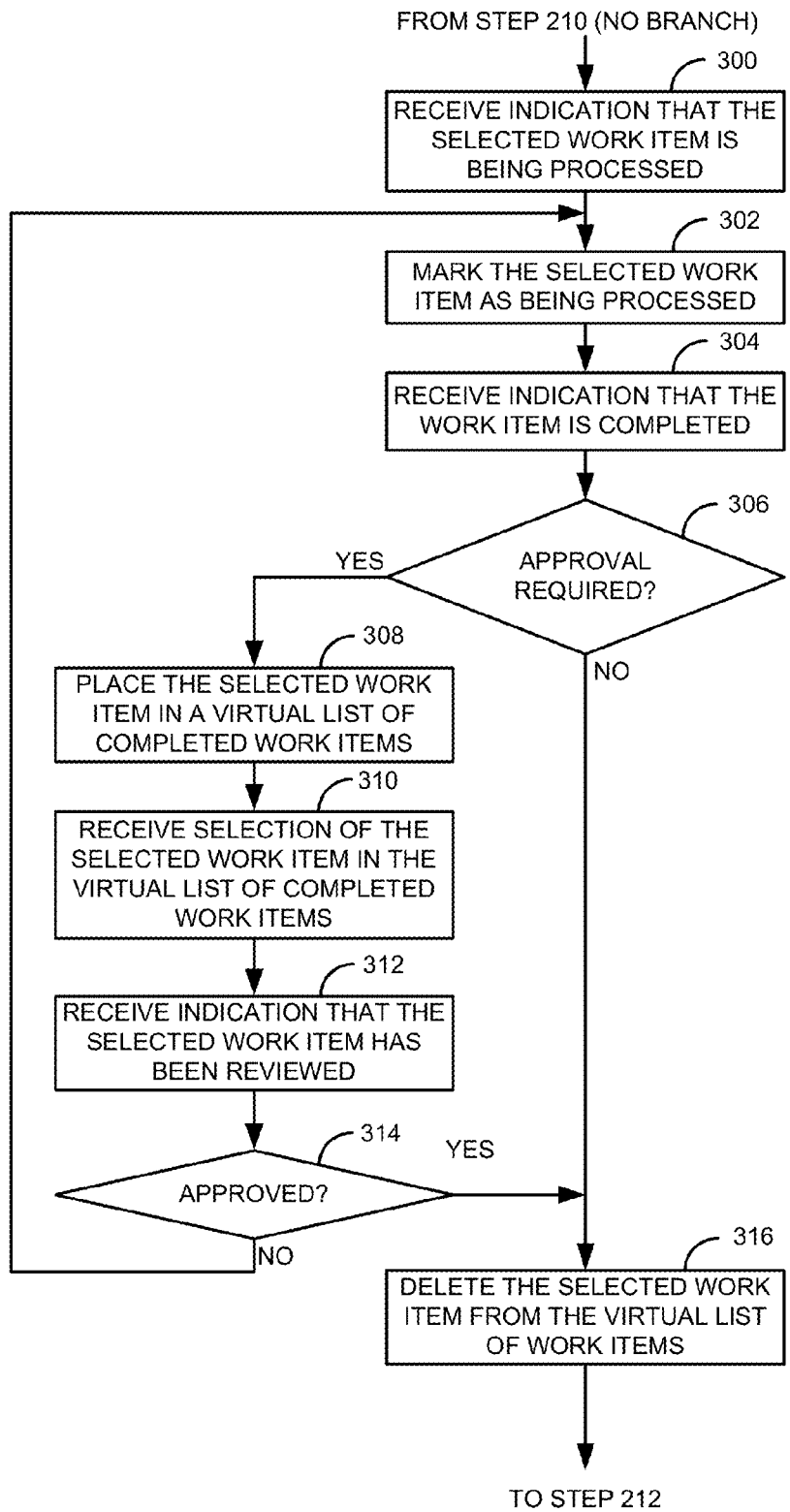
FIG. 3 is a flow diagram of a method for managing and approving work items.
Figure 4:
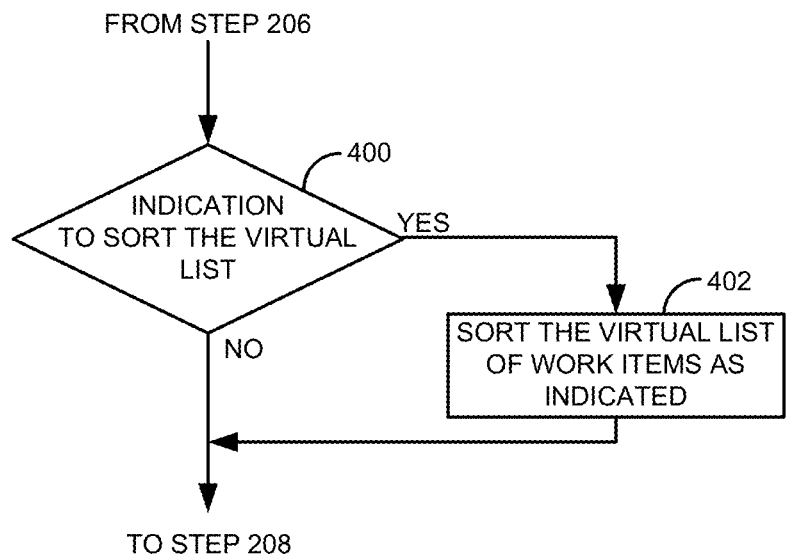
FIG. 4 is a flow diagram of a method for sorting work items.

FIG. 2 is a flow diagram of a method for virtually managing work items. Illustratively, the communication device 101, the virtual reality server 120, the work item processing module 121, the virtual reality generator 122, the presentation module 123, the security module 124, and the approver terminal 130 are stored-program-controlled entities, such as a computer or processor, which performs the method of FIGS. 2-4 and the processes described herein by executing program instructions stored in a tangible computer readable storage medium, such as a memory or disk. Although the methods described in FIGS. 2-4 are shown in a specific order, one of skill in the art would recognize that the steps in FIGS. 2-4 may be implemented in different orders and/or be implemented in a multi-threaded environment. Moreover, various steps may be omitted or added based on implementation.

The process starts in step 200. A list of work items is received 202. The process identifies 204 one or more users to work on the list of work items. A virtual setting is created 206 that includes a virtual list of work items that represents the list of work items. The virtual setting also includes a user avatar that represents the user to work on the list of work items. The virtual setting is displayed to the user and the user can then interact with the virtual setting.

The process determines in step 208 if a selection is received of a work item from the virtual list of work items. In addition, step 208 also checks to see if the user has sufficient rights to view the selected work item. A user can have sufficient rights based on various criteria, such as, a security clearance of the user, a skill level of the user, an approval by a supervisor, and the like. If the selection is received and the user does not have sufficient rights in step 208, the process goes to step 216. If a selection is not received in step 208, the process also goes to step 216.

Otherwise, if the selection is received and the user has sufficient rights in step 208, the process determines in step 210 if the selection is for an attribute. If the selection is for an attribute in step 210, the attribute associated with the selected work item is presented 214 to the user. An attribute can be any type of information associated with the work item such as how long a call has been waiting, the name of a document, a size of a document, a company associated with a contact, a type of contact, a name of a caller, a sender of an email, a phone number of a voice mail, a type of trouble ticket, any combination of these, and the like.

Otherwise, if the selection is not for an attribute in step 210, the selected work item is presented 212 to the user. For example, if the selected work item is an email, the text of the email can be presented to the user. The process can distinguish between a selection to present a work item and a selection to present an attribute based on various types of input. For instance, a right mouse click can be used to select the work item and a left mouse click could be used to select the attribute. Alternatively, selecting the work item can be based on the user avatar being behind the work item and selecting the attribute can be based on a mouse click or some other movement of the user avatar. If the process is not done in step 216, the process goes to step 202. Otherwise, the process ends in step 218.

FIG. 3 is a flow diagram of a method for managing and approving work items. Although the steps in FIG. 3 are shown serially for convenience, many of the steps described in FIG. 3 can be implements as a separate thread or process. The process described in FIG. 3 goes between step 210 (No Branch) and step 212 in FIG. 2. If the selection is not for an attribute in step 210, the process receives 300 a indication that the selected work item is being processed. The selected work item is marked 302 as being processed. The user indicates that the work item has been completed in step 304.

If the work item does not require approval in step 306, the selected work item is deleted 316 from the virtual list of work items. Otherwise, if the selected item requires approval (e.g., by a supervisor via approver terminal 130) in step 306, the selected work item is placed 308 in a virtual list of completed work items. The virtual list of completed items may contain any number of work items, including zero work items. A selection of the selected work item in the virtual list of completed work items is received 310. This is accomplished by a user represented by the approver avatar, clicking on the selected work item in the virtual list of completed work items. An indication that the selected work item has been reviewed is received in step 312. For example, after reviewing the selected work item, a supervisor can right click to approve the work item or left click to not approve the work item. If the work item is not approved, the supervisor may attach a note indicating why the work item was not approved. If the work item is not approved in step 314, the process goes to step 302. Otherwise, the process deletes 316 the selected work item from the virtual list of work items and the process goes to step 212.

FIG. 4 is a flow diagram of a method for sorting work items. The process in FIG. 4 goes between steps 206 and step 208 in FIG. 2. After creating the virtual setting in step 206, if an indication is received to sort the virtual list of work items in step 400, the process sorts 402 the virtual list of work items as indicated. For example, if the virtual list of work items is shown as a stack of documents (e.g., like shown in FIG. 6, element 620), the user could click (once to go through each document) on the document stack and get attribute information about each work item in the virtual list of work items. The user can then select which work item that the user wants to work on. After sorting the virtual list of work items in step 402, the process goes to step 208. If there is not an indication to sort the virtual list, in step 400, the process goes to step 208.

The process described in FIG. 4 is optional (or may be done automatically). For example, the virtual list of work items may have to be worked in a defined order and user may not be able to sort the virtual list of work items. Being able to sort a virtual list may be defined by an administrator or supervisor. The process described in FIG. 4, may also be used by an approver to sort through the virtual list of completed work items.

Figure 5:
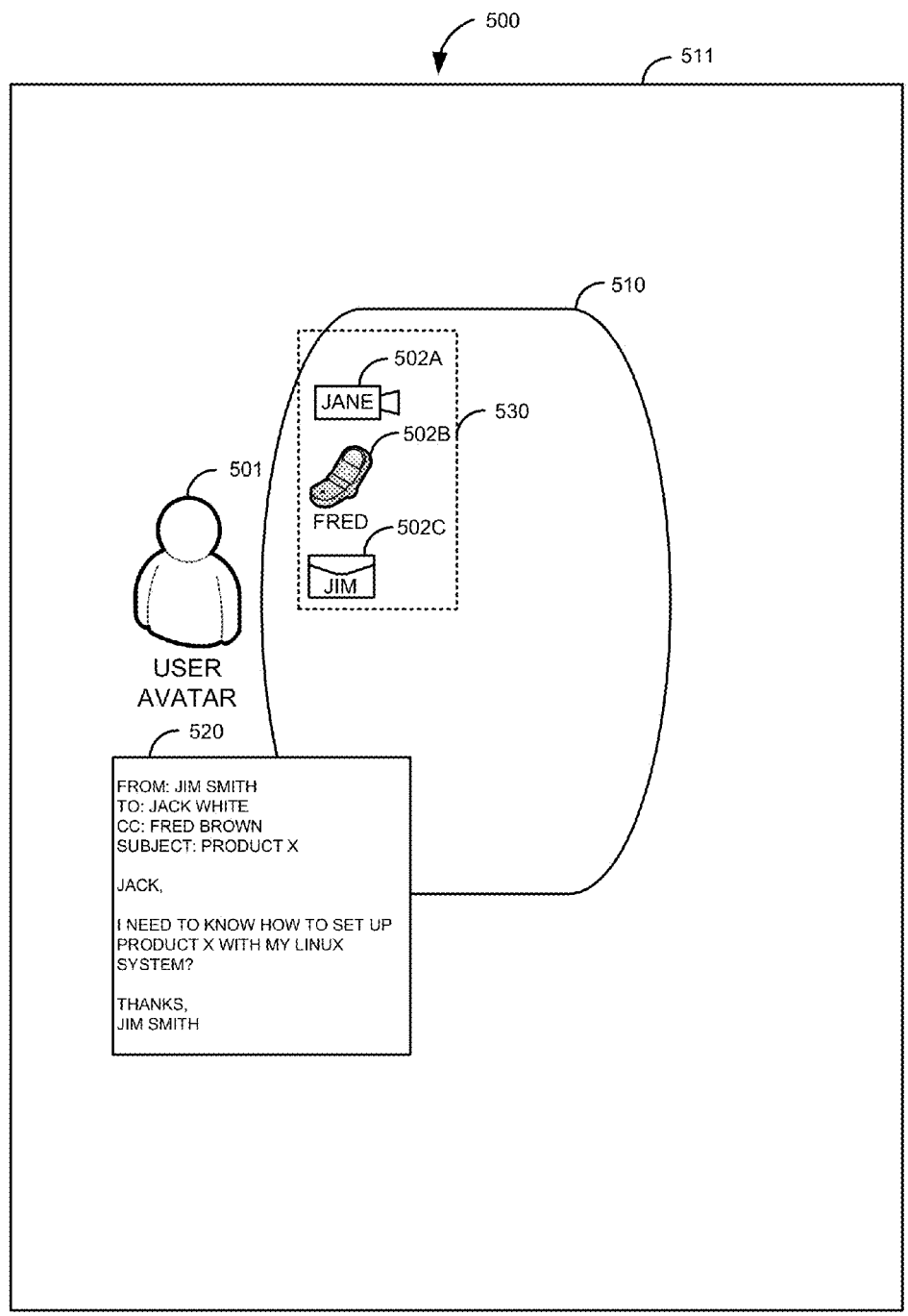
FIG. 5 is a diagram for displaying a virtual list of work items.

FIG. 5 is a diagram 500 for displaying a virtual list of work items. Diagram 500 comprises a user avatar 501, work items 502A-502C in a virtual list of work items 530, a virtual table 510, a virtual setting 511, and a work item window 520.

The user avatar 501 represents the user that will work on the list of work items. The user can move the user avatar around virtual setting 511 and virtual table 510. For example, the user can move the user avatar 501 to walk around the virtual table 510. This can be accomplished by using a mouse, a joy stick, keys on a keyboard, a touch screen, any combination of these, and the like. Although the above description describes a virtual room that the user avatar 501 can walk around, in alternative embodiments, the user avatar may be in a virtual area such as a park or lobby. The user avatar 501 may be capable of other types of motions such as jumping, flying, pointing, running, and/or the like.

Based on a defined set of work items 502 that the user is to work on, the virtual setting 511 is created. Based on the list of work items, the virtual list of work items 530 is created. In this illustrative example, the virtual setting 511 includes the user avatar 501 for a user named Jack White and the virtual list of work items 530. The virtual list of work items 530 contains three work items 502A-502B. In this exemplary embodiment, the virtual list of work items represents a universal inbox for Jack White. The work item 502A is a video mail from Jane. The work item 502B is a voice mail from Fred. The work item 502C is an email from Jim.

Jack White, via the user avatar 501 can select any of the work items 502A-502C. The work item 502 can be selected in various ways, such as by a mouse click, by the user avatar 501 being positioned behind the work item 502, by a user touching the work item 502 on a touch screen, and the like. For example, Jack White can select the work item 502C by moving the user avatar 501 next to the work item 502C (as shown in FIG. 5). Upon the selection, the work item 502C is presented via work item window 520. Since the work item 502C is an email, the work item 502C is presented visually in the work item window 520. Alternatively if the user avatar 501 is moved next to the work item 502B (a voice mail), the work item 502B would be presented to Jack White audibly. If Jack White moved the user avatar 501 next to the work item 502A (a video mail), the work item 502A would be presented both visually in the work item window 520 (displaying the video mail) and audibly.

Figure 6:
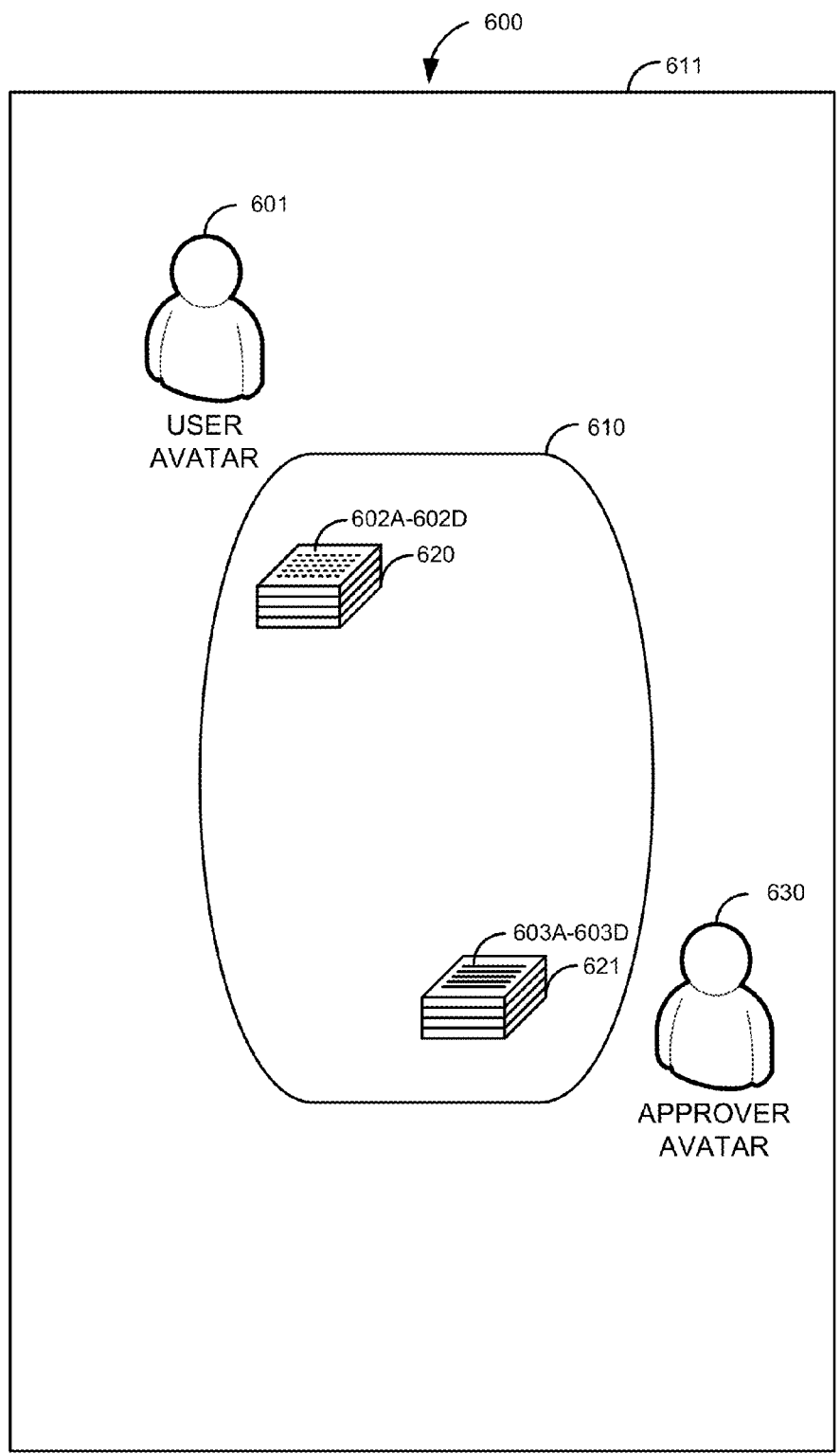
FIG. 6 is a diagram for managing and approving work items in a list of work items.

FIG. 6 is a diagram 600 for managing and approving work items in a virtual list of work items 620. Diagram 600 comprises a user avatar 601, work items 602A-602D in a virtual list of work items 620, work items 603A-603D in a virtual list of completed work items 621, virtual table 610, virtual setting 611, and approver avatar 630. In this illustrative embodiment, the virtual list of work items 620 is shown as a stack of four work items 602A-602D. Likewise, the virtual list of completed work items 621 is shown as a stack of four work items 603A-603D.

Once a work item 602 in the virtual list of work items 620 has been presented to the user, the user can indicate that the work item 602 is being processed. This can be accomplished, for example, by the user clicking on the work item 602. The indication by the user that the work item is being processed marks the work item. For instance, a color of the work item 602 can be changed in the virtual list of work items 620 (e.g., the top work item turns red). The user can then indicate that the work item 602 has been completed in various ways, such as by the user avatar 601 grabbing the work item 602 and then placing the work item 602 on the virtual list of completed work items 621, by a menu selection, by a mouse click, by a drag-in-drop, and the like. For example, the user could drag-in-drop the work item 602 from the virtual list of work items 620 on to the virtual list of completed work items 621. The work item 602 would then be deleted from the virtual list of work items 620 and a new work item 603 would be added to the virtual list of completed work items 621. The system could check to see if some fields are filled out correctly before allowing the transfer to the virtual list of completed work items 621.

An approver, via approver avatar 630 can select the work item 603. The work item 603 is presented to the approver. After reviewing the work item, the approver can approve, via the approver avatar, that the work item 603 has been reviewed by the approver. If the work item is approved, the work item 603 can be removed from the virtual list of completed work items 621. If the work item is not approved, the work item 603 can be moved back to the virtual list of work items. For example, if the work item 603 is not approved, the approver, via the approver avatar 630 could grab the work item 603 and then move the approver avatar 630 by the virtual list of work items 620. The approver then can place the work item 603 on the virtual list of work items 620.

Figure 7:
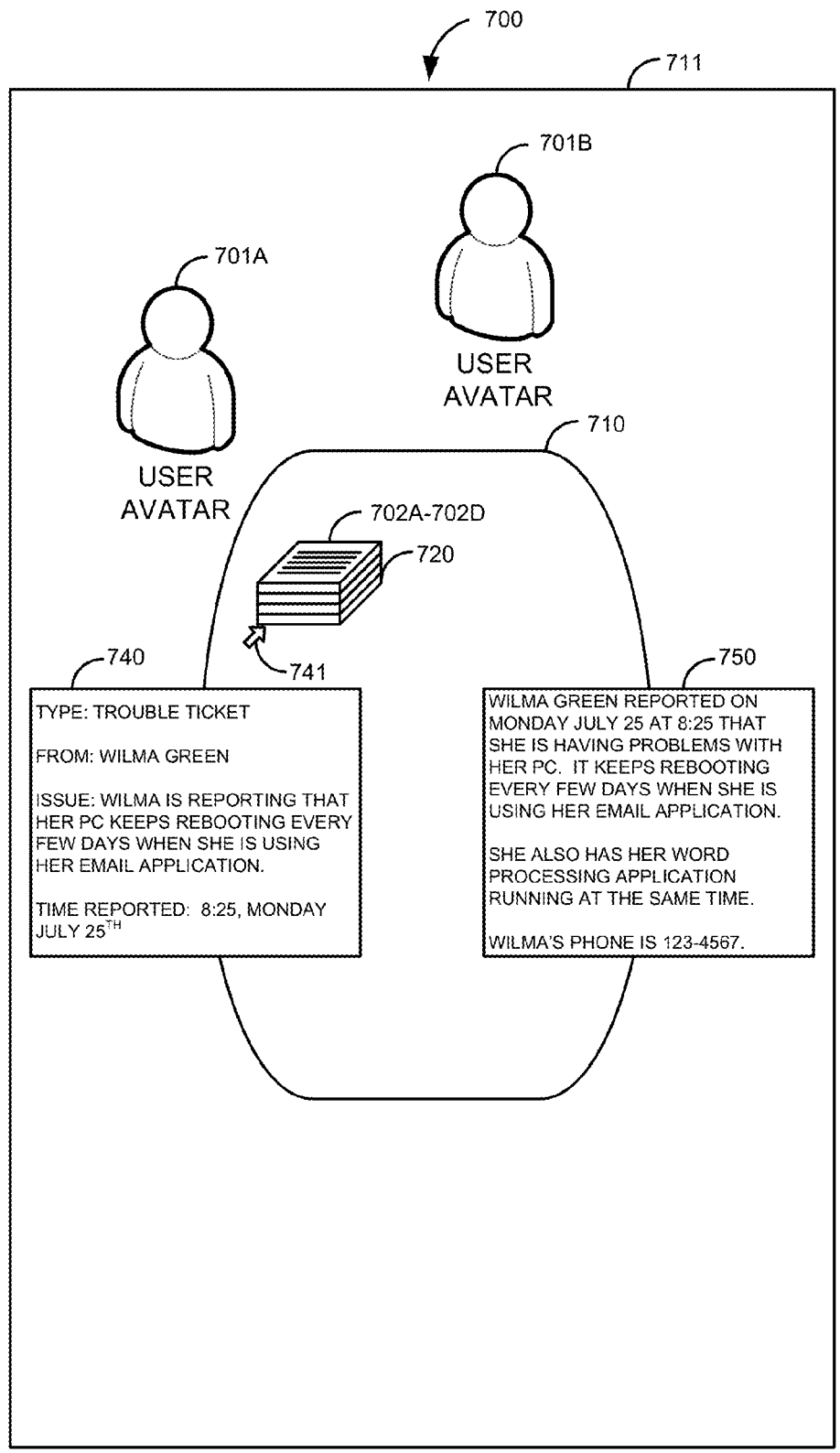
FIG. 7 is a diagram illustrating how multiple users can manage a list of work items.

FIG. 7 is a diagram 700 illustrating how multiple users can manage a list of work items. Diagram 700 comprises user avatars 701A-701B, work items 702A-702D in a virtual list of work items 720, a virtual table 710, a virtual setting 711, an attribute window 740, a cursor 741, and a work item window 750. FIG. 7 shows an illustrative example of multiple user avatars 701A-701B that each represents a different user handling work items 702A-702D. Each user can select a work item 702A-702D via their respective user avatar 701 using any of the processes described previously.

For example, a first user, via the user avatar 701A can sort through the virtual list of work items 720 by clicking (via cursor 741) on the virtual list of work items. Each click on the virtual list of work items 720 causes attribute information for a different work item to be presented in the attribute window 740. The user, via the user avatar 701A can then select a work item 702. The work item 702 can be selected by having user avatar 701A grab the work item 702 from the virtual list of work items 720. The work item is then presented to the user via work item window 750. Likewise, a second user via the user avatar 701B can sort through different work items 702A-702, select one or more of the work items 702A-702D, and view the selected work items 702.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   receiving, via a network and by a processor, a plurality electronic communications from a plurality of different communication devices;
   placing, by the processor, the plurality electronic communications in a contact center queue as list of work items;
   identifying, by the processor, a first user to work on the list of work items, wherein the first user is on a first communication device and wherein the first communication device is not one of the plurality of different communication devices;
   creating, by the processor, a virtual setting, the virtual setting comprising:
      a virtual list of work items that represent the list of work items; and a user avatar that represents the first user on the first communication device;

sending, by the processor, the virtual setting for presentation to the first user on the first communication device;

receiving, at the processor, a first selection, via the user avatar, from the first user on the first communication device, of a virtual work item from the virtual list of work items; and in response to receiving the first selection, sending, by the processor, via the network, one of the plurality of electronic communications in the contact center queue that is represented by the first selected virtual work item to the first communication device for presentation to the first user.

2. The method of claim 1, further comprising the steps of:
receiving an indication that the first selected virtual work item is being processed;
marking the first selected virtual work item as being processed in the virtual list of work items;
receiving an indication that the first selected virtual work item has been completed; and
deleting the first selected virtual work item from the virtual list of work items.

3. The method of claim 1, wherein the virtual setting further comprises an approver avatar that represents a second user on a second communication device and further comprising the steps of:
detecting that the first selected virtual work item has been completed;
placing the first selected virtual work item in a virtual list of completed work items;
receiving, at the server, a second selection, via the approver avatar, by the second user at the second communication device, of the first selected virtual work item in the virtual list of completed work items;
receiving, at the server, an indication, via the approver avatar, that the first selected virtual work item in the virtual list of completed work items has been reviewed by the second user at the second communication device; and
receiving, at the server, an approval via the approver avatar, by the second user at the second communication device, of the first selected virtual work item in the virtual list of completed work items.

4. The method of claim 1, wherein the first user is a plurality of users on a plurality of communication devices and the user avatar is a plurality of user avatars that represent the plurality of users on the plurality of communication devices, and further comprising the steps of:
receiving a second selection, from one of the plurality of users, of the first selected virtual work item; and
in response to the second selection, presenting, to the one of the plurality of users, an attribute associated with the first selected virtual work item.

5. The method of claim 1, further comprising the steps of:
receiving an indication, from the first user on the first communication device, to sort through the virtual list of work items;
receiving an indication, from the first user on the first communication device, to identify an attribute associated with the first selected virtual work item; and
presenting the identified attribute to the first user on the first communication device.

6. The method of claim 1, wherein sending the first selected virtual work item for presentation to the first user on the first communication device comprises presenting the first selected virtual work item if the first user on the first communication device has sufficient rights.

7. The method of claim 6, wherein the sufficient rights are based on at least one of: a security clearance of the first user on the first communication device, a skill level of the first user on the first communication device, or an approval from a supervisor on a second communication device.

8. The method of claim 1, wherein the list of virtual work items has to be worked in a defined order.

9. The method of claim 1, wherein the virtual list of work items represent at least one of: a group of calls in an in-bound queue in a contact center, a group of call numbers in an-outbound queue in the contact center, a group of items in an inbox, a list of trouble tickets, or a set of call back requests.

10. The method of claim 1, wherein the virtual list of work items comprises a plurality of virtual lists of work items and wherein the first user on the first communication device can select an individual virtual work item from any of the plurality of virtual lists of work items.

11. A server comprising:
a processor that executes the following:
a work item processing module that receives, via a network, a plurality of electronic communications from a plurality of different communication devices, places the plurality of electronic communications in a contact center queue as a list of work items, and identifies a first user to work on the list of work items, wherein the first user is on a first communication device and wherein the first communication device is not one of the plurality of different communication devices;
a virtual reality generator that creates a virtual setting and receives a selection via a user avatar, from the first user on the first communication device, of a first virtual work item from a virtual list of work items that represents the list of work items, wherein the virtual setting comprises: the virtual list of work items and the user avatar that represents the first user on the first communication device; and
a presentation module that sends the virtual setting for presentation to the first user on the first communication device and in response to receiving the selection sends, via the network, one of the plurality of electronic communications in the contact center queue that is represented by the first selected virtual work item to the first communication device for presentation to the first user.

12. The server of claim 11, wherein the virtual reality generator receives an indication that the first selected virtual work item is being processed, mark the first selected virtual work item as being processed in the virtual list of work items, and receive an indication that the first selected virtual work item has been completed, and wherein the work item processing module deletes the first selected virtual work item from the virtual list of work items.

13. The server of claim 11, wherein the virtual setting further comprises an approver avatar that represents a second user on a second communication device and wherein the virtual reality generator detects that the first selected virtual work item has been completed, places the first selected virtual work item in a virtual list of completed work items, receives a second selection, via the approver avatar, by the second user on the second communication device, of the first selected virtual work item in the virtual list of completed work items, receives an indication, via the approver avatar, that the selected first virtual work item has been reviewed by the second user on the second communication device, receives an approval, via the approver avatar, by the second user, of the first selected virtual work item.

14. The server of claim 11, wherein the first user is a plurality of users on a plurality of communication devices and the user avatar is a plurality of user avatars that represents the plurality of users on the plurality of communication devices, and wherein:
   the virtual reality generator receives a second selection, from one the plurality of users on the plurality of communication devices, of the first selected virtual work item; and
   the presentation module presents, to the one of the plurality of users, an attribute associated with the first selected virtual work item in response to the second selection.

15. The server of claim 11, wherein the virtual reality generator receives an indication, from the first user on the first communication device, to sort through the virtual list of work items, receives an indication, from the first user on the first communication device, to identify an attribute associated with the first selected virtual work item, and presents the identified attribute to the first user on the first communication device.

16. The server of claim 11, wherein the presentation module presents the first selected virtual work item to the first user on the first communication device if the first user on the first communication device has sufficient rights.

17. The server of claim 11, wherein the first user on the first communication device can move the user avatar into a position to be presented with the first selected virtual work item.

18. The server of claim 11, wherein the virtual list of work items represents at least one of: a group of calls in an in-bound queue in a contact center, a group of call numbers in an-outbound queue in the contact center, a group of items in an inbox, a list of trouble tickets, or a set of call back requests.

19. The server of claim 11, wherein the virtual list of work items comprises a plurality of virtual lists of work items and wherein the first user on the first communication device can select an individual virtual work item from any of the plurality of virtual lists of work items.

20. A non-transitory computer readable medium having stored thereon instructions that cause a processor to execute a method, the method comprising:
   instructions to receive, via a network, a plurality electronic communications from a plurality of different communication devices;
   instructions to place the plurality electronic communications in a contact center queue as list of work items;
   instructions to identify a user to work on the list of work items, wherein the user is on a communication device and wherein the first communication device is not one of the plurality of different communication devices;
   instructions to create a virtual setting, the virtual setting comprising:
      a virtual list of work items that represents the list of work items; and
      a user avatar that represents the user on the communication device;
   instructions to receive a selection, via the user avatar, from the user on the communication device, of a virtual work item from the virtual list of work items; and
   in response to receiving the selection, instructions to send, via the network, an electronic communication in the contact center queue that is represented by the selected virtual work item to the first communication device for presentation to the user.

* * * * *